United States Patent
Jasper et al.

(10) Patent No.: US 11,299,992 B2
(45) Date of Patent: Apr. 12, 2022

(54) ROTOR BLADE DAMPING STRUCTURES

(71) Applicant: General Electric Company, Schenectady, NY (US)

(72) Inventors: Martin James Jasper, Simpsonville, SC (US); Charles Wesley Wells, Greenville, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/829,059

(22) Filed: Mar. 25, 2020

(65) Prior Publication Data

US 2021/0301669 A1    Sep. 30, 2021

(51) Int. Cl.
*F01D 5/26*    (2006.01)
*F02C 3/04*    (2006.01)

(52) U.S. Cl.
CPC .............. *F01D 5/26* (2013.01); *F02C 3/04* (2013.01); *F05D 2240/30* (2013.01); *F05D 2240/35* (2013.01); *F05D 2260/96* (2013.01)

(58) Field of Classification Search
CPC .......... F01D 5/26; F01D 11/006; F01D 9/023; F02C 3/04; F05D 2240/30; F05D 2240/35; F05D 2260/96; F05D 2240/55; F05D 2240/57; F16J 15/025
See application file for complete search history.

(56) References Cited

U.S. PATENT DOCUMENTS

| | | | | |
|---|---|---|---|---|
| 4,872,810 A | * | 10/1989 | Brown | F01D 11/006 416/145 |
| 4,872,812 A | * | 10/1989 | Hendley | F01D 5/22 416/190 |
| 8,684,695 B2 | * | 4/2014 | Walunj | F01D 5/22 416/193 A |
| 8,790,086 B2 | * | 7/2014 | Honkomp | F01D 5/22 416/190 |
| 8,905,715 B2 | * | 12/2014 | Boyer | F01D 5/26 416/193 A |
| 9,816,393 B2 | | 11/2017 | Simon-Delgado et al. | |
| 9,840,931 B2 | * | 12/2017 | Joshi | F16J 15/0887 |
| 9,845,690 B1 | * | 12/2017 | Giametta | F01D 9/023 |
| 9,890,651 B2 | * | 2/2018 | Heaven | F01D 11/00 |
| 2006/0257262 A1 | * | 11/2006 | Itzel | F01D 5/26 416/248 |

OTHER PUBLICATIONS

Co-Pending U.S. Appl. No. 16/722,020, filed Dec. 20, 2019.

\* cited by examiner

*Primary Examiner* — Jesse S Bogue
(74) *Attorney, Agent, or Firm* — Dority & Manning, P.A.

(57) ABSTRACT

Rotor blades and turbomachines are provided. The rotor blade includes a main body having a shank, an airfoil extending radially outwardly from the shank, and a platform. The main body further includes a pressure-side slash face and a suction-side slash face. Each of the pressure-side slash face and the suction-side slash face includes a damper land and defines a slot. The damper land is disposed radially inward from the slot.

15 Claims, 7 Drawing Sheets

ROTOR BLADE DAMPING STRUCTURES

FIELD

The present disclosure relates generally to rotor blades for turbomachines and, more particularly, to improved rotor blade damping structures.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The compressor section and the turbine section generally include a plurality of rotor blades, typically arranged in a plurality of stages. During engine operation, vibrations may be introduced into the rotor blades. For example, fluctuations in flow of the working fluid being compressed or the hot combustion gases or steam may cause the rotor blades to vibrate. One basic design consideration for turbomachine designers is to avoid or minimize resonance with natural frequencies of the rotor blades and the dynamic stresses produced by forced response and/or aero-elastic instabilities, thus controlling high cycle fatigue of the rotor blades.

For example, in order to improve the high cycle fatigue life of a rotor blade, vibration dampers are typically provided below and/or between the platforms to frictionally dissipate vibratory energy and reduce the corresponding amplitude of vibration during operation.

Issues exist with the use of vibration dampers in known rotor blade platforms. The design of the rotor blade platform directly impacts the effectiveness of the vibration damper during operation. For example, one known issue is that stiffness of known blade platforms, which is required to maintain structural integrity, results in lower vibration damping effectiveness. Another issue with many known blade platforms is the limited space on the platform itself within which to install a vibration damper. For example, use of a vibration damper on a blade platform may restrict or inhibit the use of leak-proof seals due to lack of space.

Accordingly, improved rotor blade platform designs are desired in the art. In particular, platforms that provide decreased stiffness while still providing the required structural integrity for the blade are desired. Further, rotor blade platform designs that allow the use of both a vibration damper and a platform seal are desired.

BRIEF DESCRIPTION

Aspects and advantages of rotor blades and turbomachines in accordance with the present disclosure will be set forth in part in the following description, or may be obvious from the description, or may be learned through practice of the technology.

In accordance with one embodiment, a rotor blade for a turbomachine is provided. The rotor blade includes a main body having a shank, an airfoil extending radially outwardly from the shank, and a platform. The main body further includes a pressure-side slash face and a suction-side slash face. Each of the pressure-side slash face and the suction-side slash face includes a damper land and defines a slot. In both the pressure-side slash face and the suction-side slash face, the damper land is disposed radially inward from the slot.

In accordance with another embodiment, a turbomachine is provided. The turbomachine includes a compressor section, a combustor section, and a turbine section. The turbomachine further includes a plurality of rotor blades provided in at least one of the compressor section or the turbine section. Each of the plurality of rotor blades includes a main body having a shank, an airfoil extending radially outwardly from the shank, and a platform. The main body includes a pressure-side slash face and a suction-side slash face. Each of the pressure-side slash face and the suction-side slash face includes a damper land and defines a slot. In both the pressure-side slash face and the suction-side slash face, the damper land is disposed radially inward from the slot.

These and other features, aspects and advantages of the present rotor blades and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present damper stacks, rotor blades, and turbomachines, including the best mode of making and using the present systems and methods, directed to one of ordinary skill in the art, is set forth in the specification, which makes reference to the appended figures, in which.

DETAILED DESCRIPTION

Figure 1:
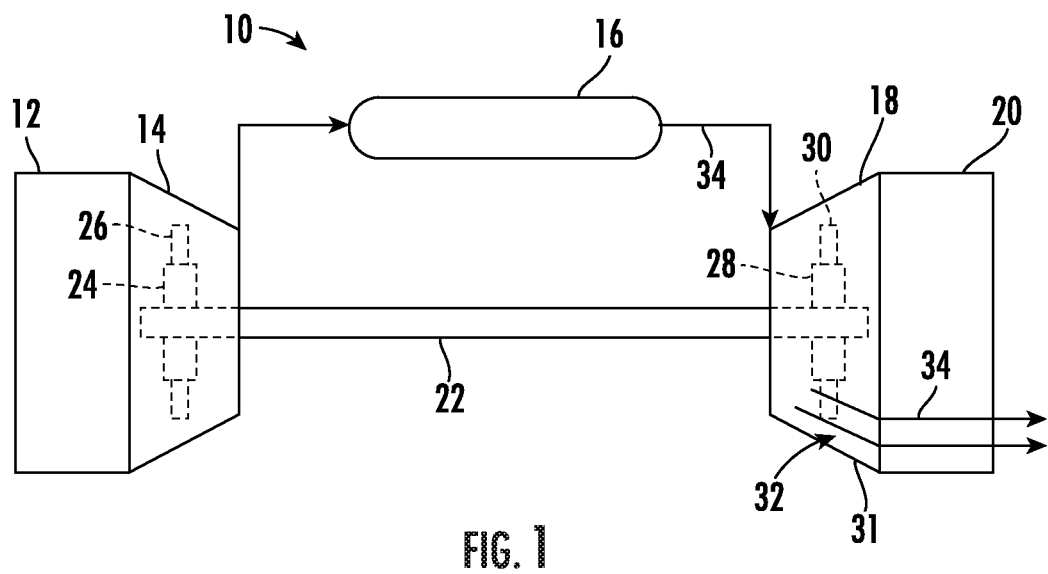
FIG. 1 illustrates a schematic diagram of a turbomachine, in accordance with embodiments of the present disclosure.

Reference now will be made in detail to embodiments of the present rotor blades and turbomachines, one or more examples of which are illustrated in the drawings. Each example is provided by way of explanation, rather than limitation of, the technology. In fact, it will be apparent to those skilled in the art that various modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component; the term "axially" refers to the relative direction that is substantially parallel to and/or coaxially aligned with an axial centerline of a particular component; and the term "circumferentially" refers to the relative direction that extends around the axial centerline of a particular component.

Terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of a turbomachine, which in the illustrated embodiment is a gas turbine 10. Although an industrial or land-based gas turbine is shown and described herein, the present disclosure is not limited to a land based and/or industrial gas turbine, unless otherwise specified in the claims. For example, the invention as described herein may be used in any type of turbomachine including, but not limited to, a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16 and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to, or may form, a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to, or may form, a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the one or more combustors of the combustion section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, thus causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

FIGS. 2-8 illustrate embodiments of a rotor blade in accordance with embodiments of the present disclosure. In the embodiments shown, the rotor blade is a turbine blade or bucket 30, although in alternative embodiments the rotor blade could be a compressor blade or bucket 26.

The rotor blade 30 may include a main body 35, which includes an airfoil 36 and a shank 38. The airfoil 36 may extend and be positioned radially outwardly from the shank 38. The shank 38 may include a root or dovetail 40, which may attach to the rotor disk 28 to facilitate rotation of the rotor blade 30.

The airfoil 36 may have a generally aerodynamic contour. For example, the airfoil 36 may have an exterior surface defining a pressure side and suction side, each of which extends between a leading edge and a trailing edge. The exterior surface of the shank 38 may include a pressure side face, a suction side face, a leading edge face, and a trailing edge face.

The main body 35 may further include a platform 42. A typical platform may be positioned at an intersection or transition between the airfoil 36 and shank 38 and may extend outwardly relative to the shank in the generally axial and tangential directions, as shown. In the turbine section 18, the platform 42 generally serves as a radially inward flow boundary for the combustion gases 34 flowing through the hot gas path 32. The platform 42 may include a leading edge face 52 axially spaced apart from a trailing edge face 54. The leading edge face 52 is positioned into the flow of combustion gases 34, and the trailing edge face 54 is positioned downstream from the leading edge face 52. Furthermore, the main body 35 may include a pressure-side slash face 56 circumferentially spaced apart from a suction-side slash face 58.

Figure 2:
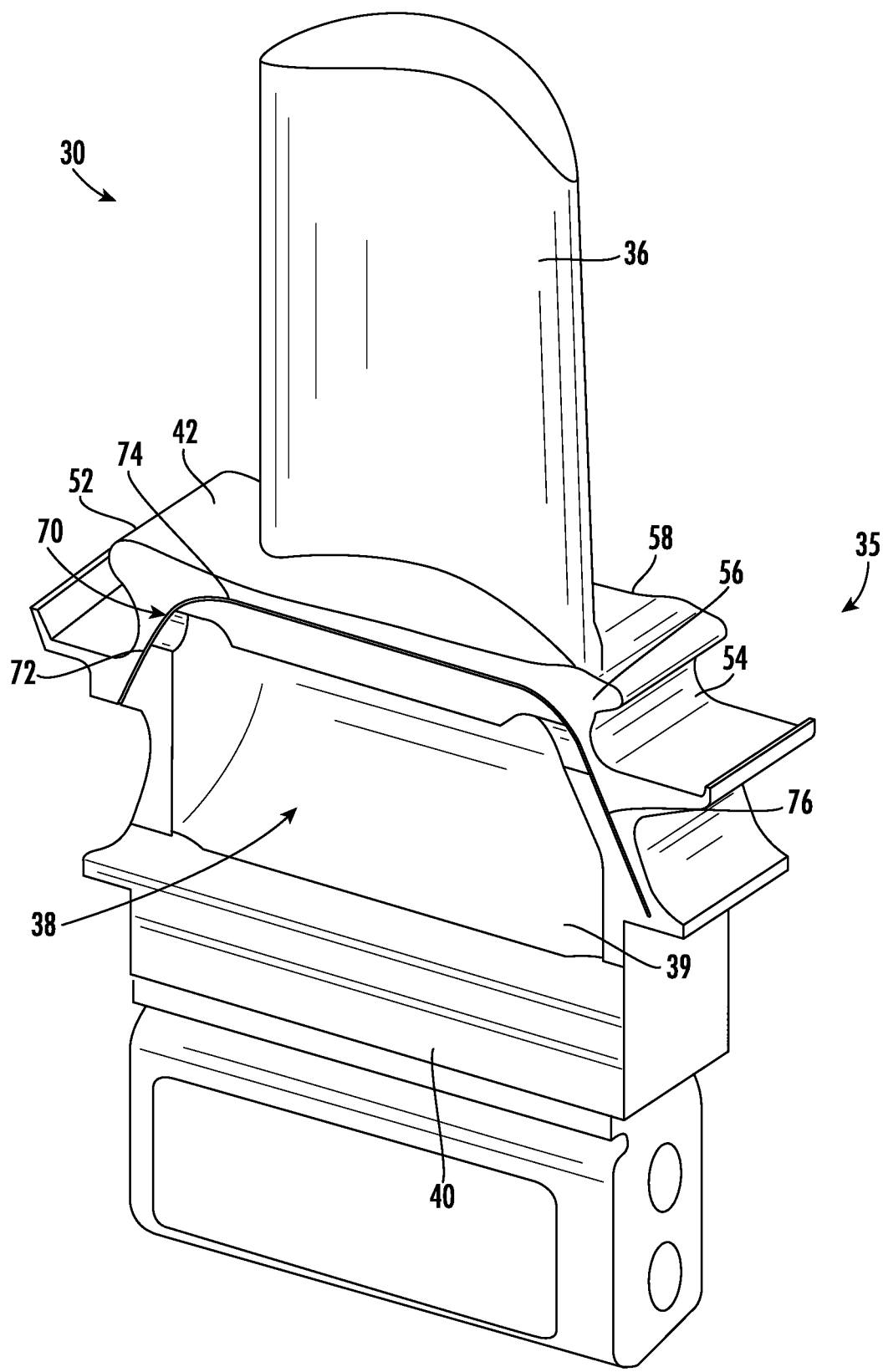
FIG. 2 illustrates a perspective pressure side view of a rotor blade, in accordance with embodiments of the present disclosure.
Figure 3:
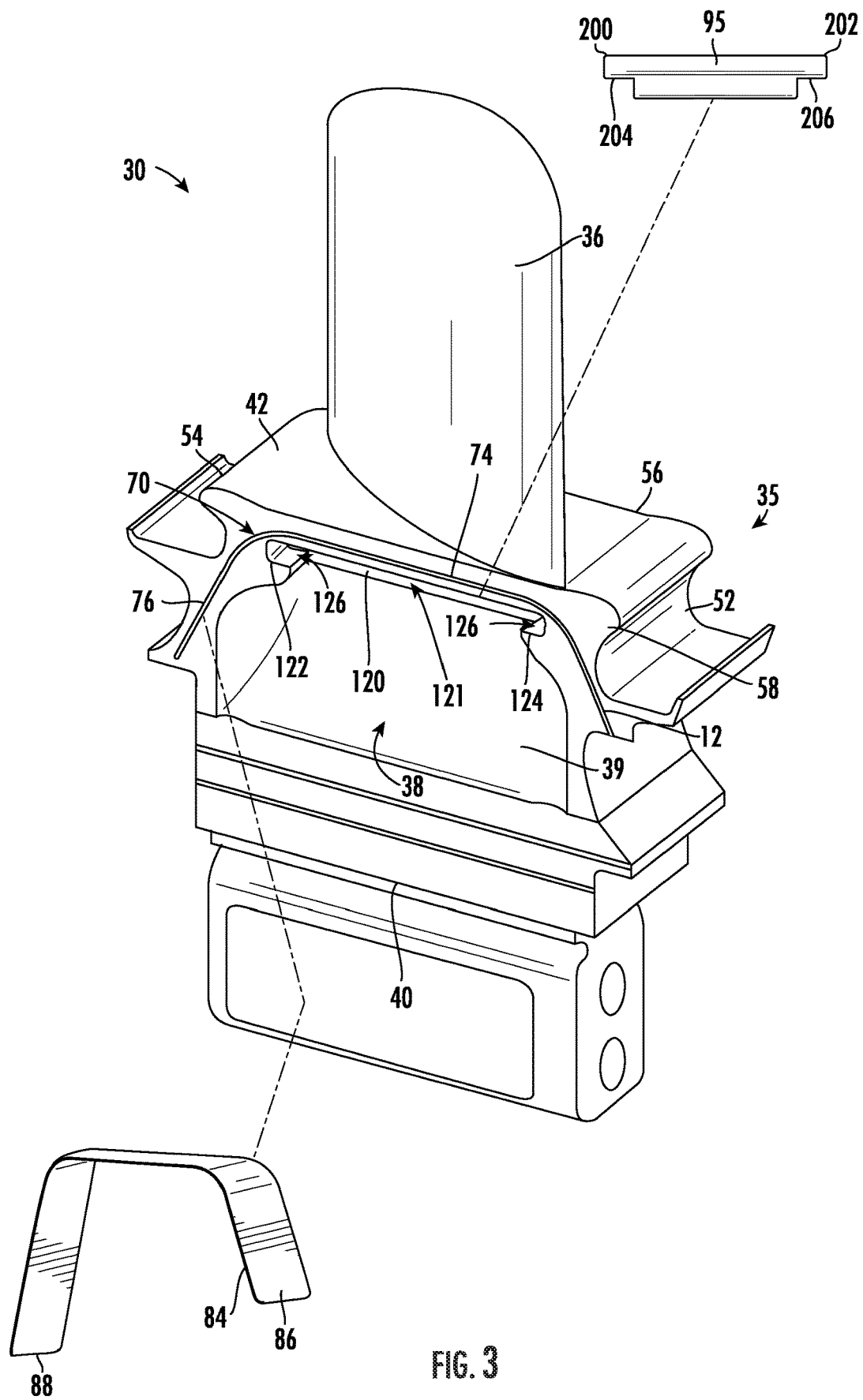
FIG. 3 illustrates a perspective suction side view of a rotor blade and a damper pin, in accordance with embodiments of the present disclosure.

In some embodiments, as illustrated in FIGS. 2 and 3, the pressure-side slash face 56 and/or the suction-side slash face 58 may be generally planar faces (which may be conventionally planar or skewed). In other embodiments, such as the ones shown in FIGS. 5-7, the pressure-side slash face 56 and/or suction-side slash face 58, or at least portions thereof, may be curviplanar. For example, the slash face 56 and/or 58 may be curved relative to the axial direction, radial direction, and/or tangential direction.

Figure 4:
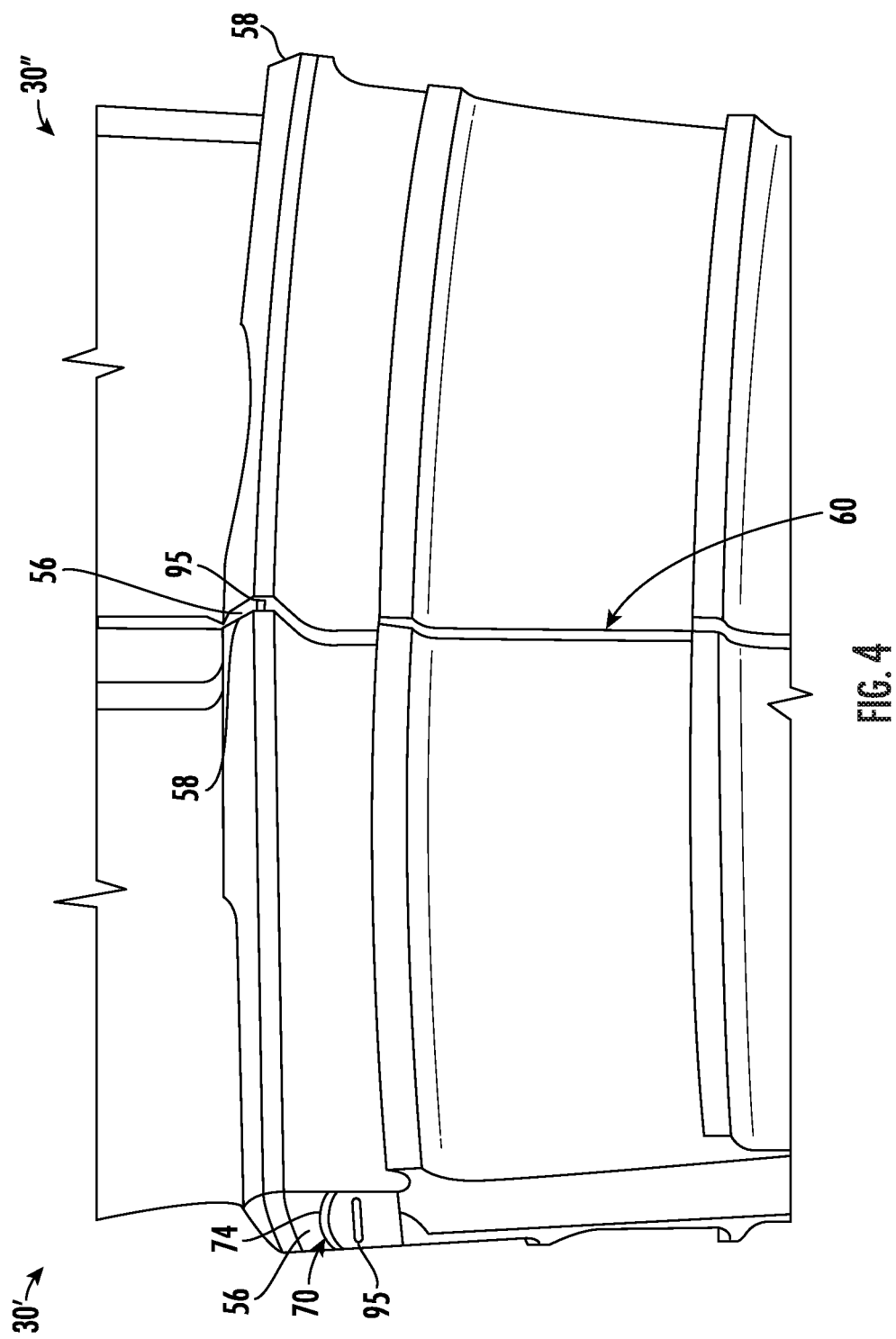
FIG. 4 is a side view illustrating neighboring rotor blades, in accordance with embodiments of the present disclosure.

FIG. 4 illustrates a pair of circumferentially adjacent, neighboring rotor blades 30', 30". As shown, the pressure-side slash face 56 of a rotor blade 30 faces the suction-side slash face 58 of a neighboring rotor blade 30 when the rotor blades 30 are so positioned. As discussed above, a plurality of rotor blades 30 may be provided on each of one or more rotor disks 28 and may extend radially outwardly therefrom. The rotor blades 30 provided on a rotor disk 28 may be assembled in a circumferential array, such that the pressure-side slash face 56 of each rotor blade 30 faces the suction-side slash face 58 of each neighboring rotor blade 30 when the rotor blades 30 are so assembled. In some embodiments, the pressure-side slash face 56 of each rotor blade 30 and the suction-side slash face 58 of each neighboring rotor blade 30 may define a gap 60 in the circumferential direction.

Referring again to FIG. 3, one or more damper pins 95 may be provided in the rotor blade 30, in accordance with the present disclosure. Each damper pin 95 may include a first end 200 axially separated from a second end 202. The first end 200 and second end 202 may each include a shoulder 204, 206 respectively. Each damper pin 95 may be disposed at and in contact with a slash face 56, 58 (e.g. the pressure-side slash face 56 or suction-side slash face 58) of the rotor blade 30 and may extend generally along the axial direction and thus generally along the length of the slash face 56, 58, as shown.

Further, as illustrated in FIG. 4, the damper pin 95 in accordance with the present disclosure may be disposed between and in contact with the neighboring, facing, pressure-side slash face 56 or suction-side slash face 58 of a neighboring, circumferentially adjacent rotor blade 30.

Damper pins 95 in accordance with the present disclosure advantageously serve as vibration dampers. In operation, a damper pin 95 frictionally dissipates vibratory energy and reduces corresponding amplitude of vibration.

FIGS. 2 and 3 illustrate the pressure-side slash face 56 and the suction-side slash face 58 of the main body 35. As shown, the main body 35 may include one or more slots 70 defined within the pressure-side slash face 56 and/or within the suction-side slash face 58 of the main body 35. In some embodiments, the slot 70 may be one continuous groove defined along each of the pressure-side slash face 56 and the suction-side slash face 58. The slot 70 may include a leading edge segment 72, a platform segment 74, and a trailing edge segment 76. The leading edge segment 72 may be defined along the leading edge face 52, the platform segment 92 may be defined along the platform 42, and the trailing edge segment 76 may be defined along the trailing edge face 56. As used herein, terms such as "defined along" and cognates thereof may mean "substantially parallel to" or "generally aligned with."

In other embodiments, the leading edge segment 72 and the trailing edge segment 76 of slot 70 may be oriented generally radially with respect to the axial centerline of gas turbine 10. Likewise, the platform segment 74 of slot 70 may be oriented generally axially with respect to the axial centerline of gas turbine 10. In some embodiments, the leading edge segment 72 may be directly connected to and continuous with the platform segment 74, and the platform segment 74 may be directly connected to and continuous with the trailing edge segment 76. In some embodiments, the platform segment 74 may be defined within the platform 42 and oriented axially with respect to the axial centerline of gas turbine 10.

In alternative embodiments (not shown), the slot 70 may be discontinuous. In such embodiments, the leading edge segment 72, the platform segment 74, and the trailing edge segment 76 may be wholly separate slots or grooves defined circumferentially within the pressure-side slash face 56 and/or the suction-side slash face 58.

As shown in FIG. 3, the main body 35 may further include a suction-side damper land 120. The suction-side damper land 120 may include a first end 122 axially separated from a second end 124. In many embodiments, a cutout 121 may be defined in the suction-side damper land 120. The cutout 121 includes shoulder slot portions 126 defined at the first end 122 and the second end 124 of the suction-side damper land 120. The shoulder slot portions 126 define support surfaces 128, which in exemplary embodiments may be a flat, planar surfaces. In these embodiments, the shoulders 204 and 206 of the damper pin 95 may be disposed in the shoulder slot portions 126, such that the support surfaces 128 may contact the shoulders 204 and 206. Accordingly, the damper pin 95 may be supported in the suction-side damper land 120, and undesirable excessive rotation during use and operation may be reduced or prevented.

Further, as shown in FIG. 3, the slot 70 may be sized to securely contain a portion of a seal 84 therein, i.e., the slot 70 may be sized to prevent the seal 84 from sliding out of the slot 70 during operation of the gas turbine 10. Seal 84 may include a first end 86 and a second end 88 and may extend therebetween. Seal 84 may be sized to sealingly fit at least partially into the slot 70.

Figure 8:
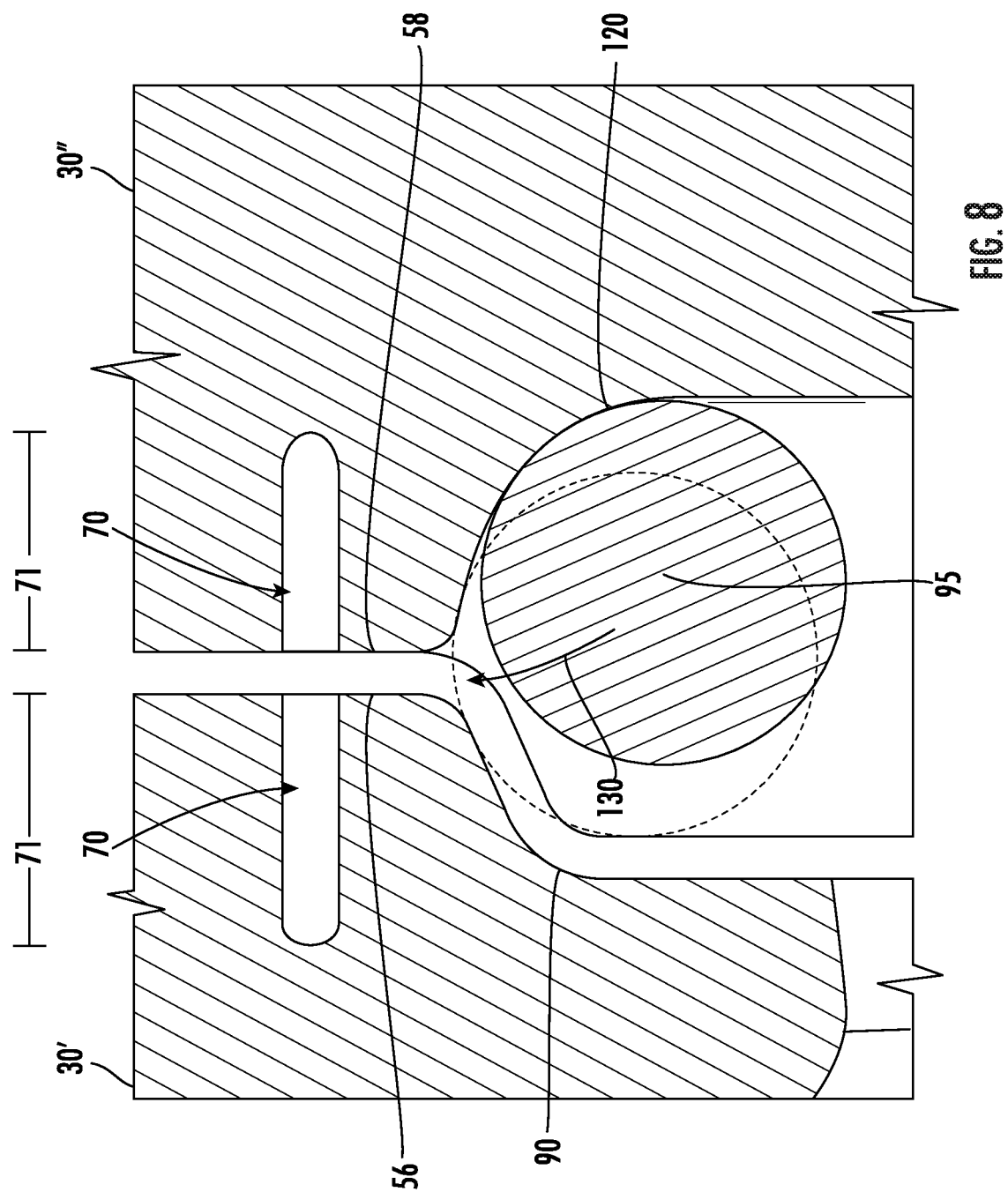
FIG. 8 is an enlarged cross-sectional view illustrating the damper lands of two neighboring rotor blades, in accordance with embodiments of the present disclosure.

When two or more blades 30 are arranged adjacent to one another on a rotor disk 24, such as the configuration shown in FIGS. 4 and 8 and discussed above, the slot 70 of the pressure-side slash face 56 of each rotor blade 30 aligns with the slot 70 of the suction-side slash face 58 of a neighboring rotor blade 30 to define a channel. Rotor blades 30 arranged adjacent to one another may include rotor blades 30 directly neighboring one another on a rotor disk 24 and/or rotor blades 30 in direct contact with one another. The seal 84 (shown in FIG. 3) may be housed within the channel defined by each slot 70. The seal 84 may extend between and into both slots 70 of neighboring rotor blades 30', 30". In some embodiments, the seal 84 prevents unwanted hot gas from the turbine section 18 from leaking into the main body 35 of blade 30. Alternatively, or additionally, in many embodiments, the seal 84 may prevent compressed cooling air from the compressor section 14 from leaking out of the shank 38 and into the turbine section 18.

Figure 5:
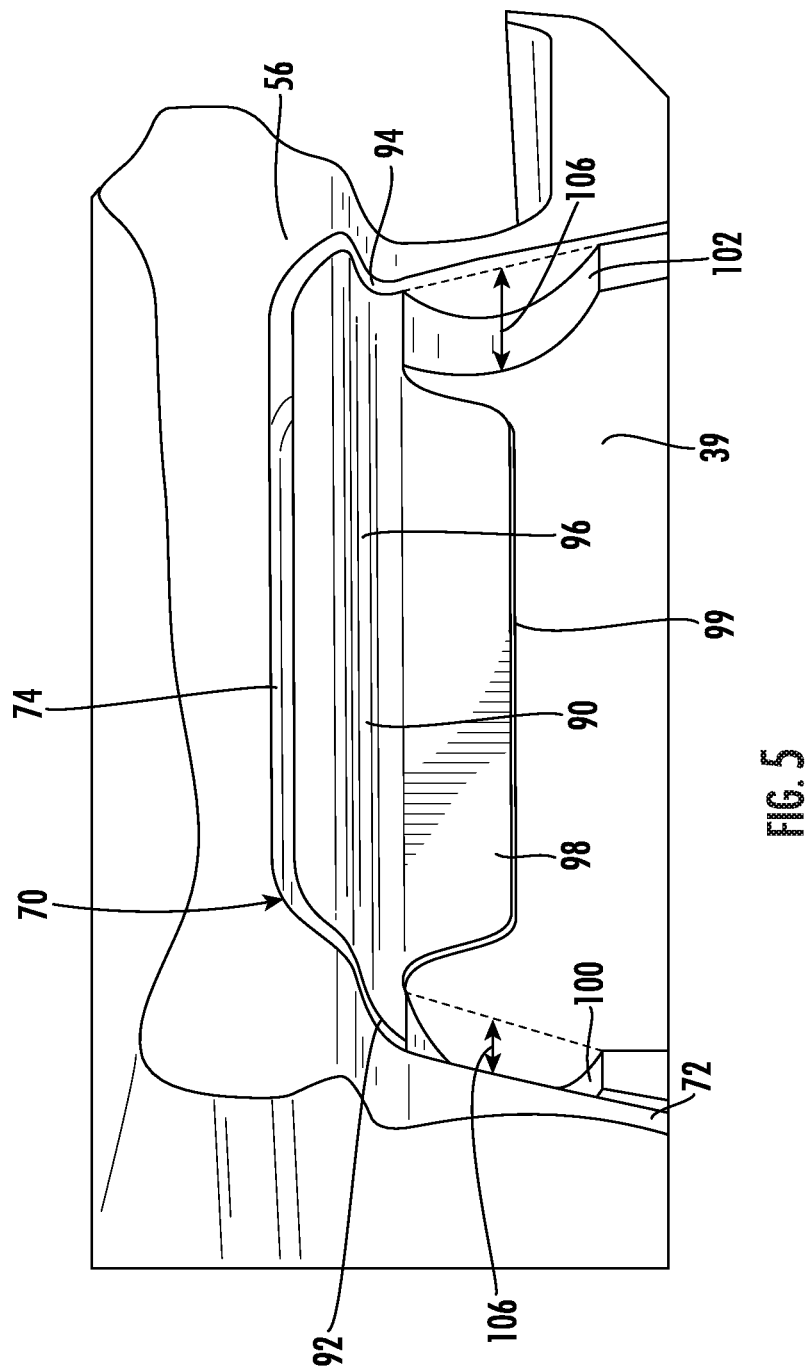
FIG. 5 illustrates an enlarged perspective pressure side view of a rotor blade, in accordance with embodiments of the present disclosure.
Figure 6:
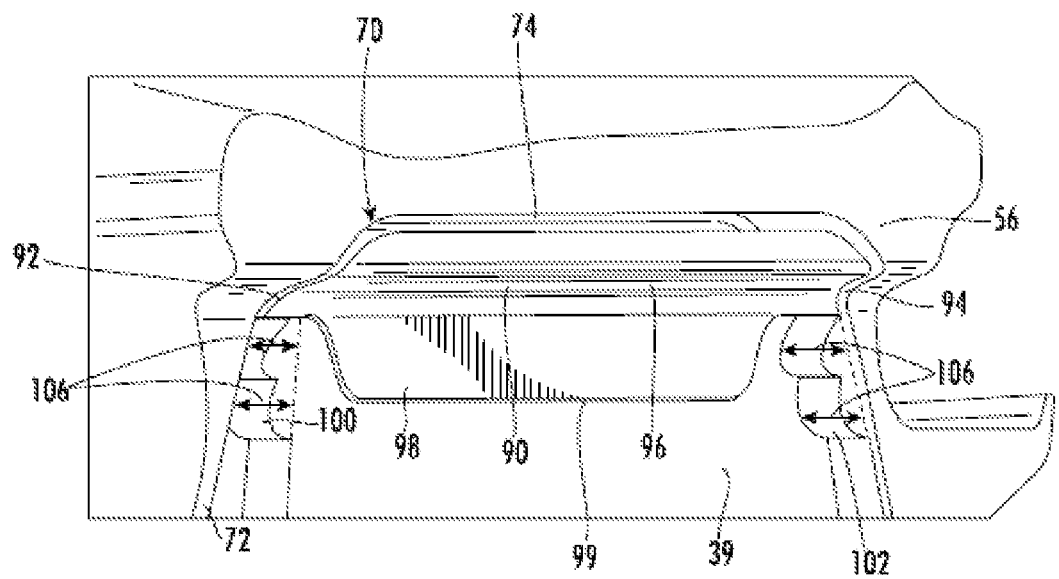
FIG. 6 illustrates an enlarged perspective pressure side view of a rotor blade, in accordance with other embodiments of the present disclosure.
Figure 7:
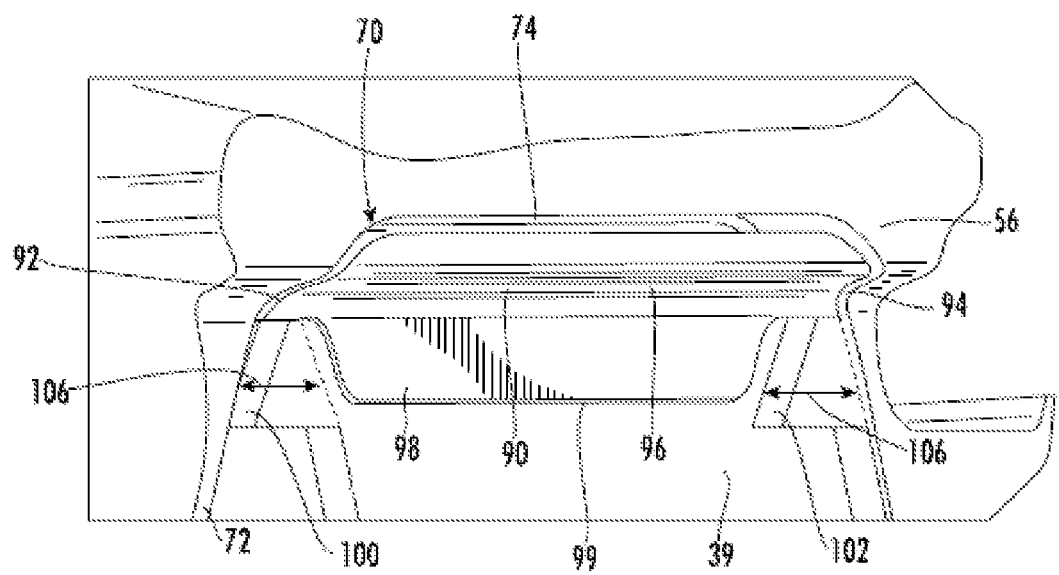
FIG. 7 illustrates an enlarged perspective pressure side view of a rotor blade, in accordance with still further embodiments of the present disclosure.

As shown in FIGS. 5-7, the pressure-side slash face 56 may further include a pressure-side damper land 90 having a first end 92 and a second end 94. In some embodiments, the first end 92 of the pressure-side damper land 90 may be axially separated from the second end 94. In various embodiments, the first end 92 of the pressure-side damper land may partially define the leading edge segment 72 of the slot 70 and may extend to the second end 94, which partially defines the trailing edge segment 76 of the slot 70. In many embodiments, the pressure-side damper land 90 may be positioned radially inwardly from the slot 70. Specifically, the pressure-side damper land 90 may be positioned radially inwardly from the platform segment 74 of the slot 70. In some embodiments, the pressure-side damper land 90 may be oriented parallel to the platform segment 74 of slot 70. In other embodiments, the pressure-side damper land 90 may be oriented axially with respect to the axial centerline of the gas turbine 10.

The pressure-side damper land 90 may function to provide a surface for a damper pin 95 to be positioned thereon and provide vibrational damping to rotor blade 30. In many embodiments, the surface of the pressure-side damper land 90 may be slightly contoured to the shape of damper pin 95 to provide increased surface contact and vibrational damping. For example, the pressure-side damper land 90 further include a curved portion 96 and a flat portion 98. The curved portion 96 may curve circumferentially inwardly from the platform 42 to the flat portion 98. The flat portion 98 of the pressure-side damper land 90 may extend radially inwardly from the curved portion 96 to a shank cutout 39 defined in the main body 35. The flat portion 98 may be generally parallel to the platform 42 with respect to both the axial and radial directions of gas turbine 10.

In some embodiments, the pressure-side damper land 90 may be substantially cantilevered due to the slot 70 and its flat portion 98. For example, the flat portion 98 of pressure-side damper land 90 may extend from the curved portion 96 radially inwardly to a free end 99. The free end 99 may be substantially cantilevered within the shank cutout 39 to advantageously provide for increased compliance in the overall platform 42 of rotor blade 30, thereby effectively increasing vibrational damping. In various embodiments, the flat portion 98 of pressure-side damper land may taper axially inward from the curved portion 96 to the free end 99. In various embodiments, the flat portion 98 of pressure-side damper land 90 may taper away from a first undercut 100 and a second undercut 102 at its respective ends.

In addition to providing a housing for the seal 84, the slot 70 may provide decreased material stiffness and increased compliance in the pressure-side damper land 90 that allows for increased vibrational damping to the overall blade 30. Further, the slot 70 may include a slot depth 71. Altering the slot depth, i.e. increasing or decreasing, 71 may advantageously increase or decrease the overall stiffness of the pressure-side land 90 resulting in an increase in overall damping effectiveness.

In some embodiments, such as those shown in FIGS. 5-7, the pressure-side slash face 56 may further include a first undercut 100 and a second undercut 102. The first undercut 100 and the second undercut 102 serve to advantageously alter, i.e. increase or decrease, the stiffness of the shank 38 to improve the overall vibration damping effectiveness. In the embodiment shown in FIG. 5, the first undercut 100 and the second undercut 102 may be semi-circular cuts defined circumferentially inward on the main body 35 of rotor blade 30. In some embodiments, the first undercut 100 and second undercut 102 may be substantially curved or arcuate. In other embodiments, such as the ones shown in FIGS. 6 and 7, the first undercut 100 and second undercut 102 may include multiple semi-circular cuts or trapezoidal shaped cuts.

In many embodiments, the first undercut 100 may be disposed directly radially inwardly from the first end 92 of the pressure-side damper land 90, and the second undercut 102 may be axially separated from the first undercut 100 and may be disposed directly radially inwardly from the second end 94 of the pressure-side damper land 90. In some embodiments, the first undercut 100 and the second undercut 102 may extend generally radially inward from the first end 92 and the second end 94, respectively, of the pressure-side damper land 90. In many embodiments, both the first undercut 100 and the second undercut 102 may extend radially inwardly past the free end 99 of pressure-side damper land 90.

The first undercut 100 and the second undercut 102 may each partially define the slot 70. More specifically, the first undercut 100 may partially define the leading edge segment 72 of the slot 70. Likewise, the second slot 102 may partially define the trailing edge segment 76 of the slot 70. In various embodiments, the first undercut 100 may be disposed axially between the leading edge segment 72 of slot 70 and the flat portion 98 of the pressure-side damper land 90. The second undercut 102 may be disposed axially between the flat portion 98 of the pressure-side damper land 90 and the trailing edge segment 76 of the slot 70.

The first undercut 100 and the second undercut 102 may each include a maximum undercut depth 106 defined in the circumferential direction. The maximum undercut depth 106 of the first undercut 100 may be the same as, or different from, the maximum undercut depth 106 of the second undercut 102. Altering the maximum undercut depth 106 of the first undercut and/or the second undercut 102 will advantageously change, i.e. increase or decrease, the stiffness of the pressure-side damper land 90, resulting in increased damping effectiveness. In some embodiments, the maximum undercut depth 106 for a respective undercut 100, 102 may be up to about one and a half inches. In other embodiments, the maximum undercut depth 106 may be up to about one inch. In some embodiments, the maximum undercut depth 106 may be up to about 0.75 inches. In various embodiments, the maximum undercut depth 106 may be up to about 0.5 inches. In other embodiments, the maximum undercut depth 106 may be up to about 0.25 inches.

FIG. 8 illustrates a cross-sectional view of a pair of circumferentially adjacent, neighboring rotor blades. As shown, the pressure-side damper land 90 of a first rotor blade 30' aligns with the suction-side damper land 120 of a neighboring second rotor blade 30" when the rotor blades 30', 30" are so positioned. As shown in FIG. 8, the damper pin 95 may be disposed along the suction-side damper land 120. In operation, the damper pin 95 may move in the direction of arrow 130 and contact both the pressure-side damper land 90 and the suction-side damper land 120 to provide vibrational damping to the neighboring rotor blades 30', 30".

Further, the slot depth 71' of the pressure-side slash face 56 may be different than the slot depth 71" of the suction-side slash face 58. For example, the slot depth 71' of the pressure-side slash face 56 may be larger than the slot depth 71" of the suction-side slash face 58, or vice versa. In general, the summation of slot depth 71' of the pressure-side slash face 56, the width of gap 60 (shown in FIG. 4) in the circumferential direction, and the slot depth 71" of the suction-side slash face 58 may be generally equal to, or slightly larger than, the width of the seal 84. In various embodiments, the seal 84 may be smaller than the slots 70 and may have room for thermal expansion within the slots 70. Additionally, the seal 84 may be sized to allow for manufacturing variations thereof.

For example, in many embodiments, the width of seal 84 may be between about 5% and about 30% the width of the channel to allow for both manufacturing variations and thermal expansion within the slots 70. The embodiments shown in FIGS. 2-8 allow for the use of both a vibration damping pin 95 and a seal 84. In various embodiments, the blade 30 may include only a vibration damping pin 95, only a seal 84, or both a vibration damping pin 95 and a seal 84.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims, if they include structural elements that do not differ from the literal language of the claims or if they include equivalent structural elements with insubstantial differences from the literal language of the claims.

What is claimed is:

1. A rotor blade for a turbomachine, the rotor blade comprising:
   a main body having a shank, an airfoil extending radially outwardly from the shank, and a platform, the main body comprising a pressure-side slash face and a suction-side slash face, a leading edge face and a trailing edge face;
   wherein each of the pressure-side slash face and suction-side slash face comprises a damper land and defines a slot; and
   wherein the damper land of the pressure-side slash face is disposed radially inward from at least a portion of the slot of the pressure-side slash face, wherein both the damper land of the pressure-side slash face and the slot of the pressure-side slash face at least partially define one or more pressure-side undercuts, and wherein the damper land of the suction-side slash face is disposed radially inward from at least a portion of the slot of the suction-side slash face; wherein both the damper land of the pressure-side slash face and the damper land of the suction-side slash face comprise a first end and a second end, the first end spaced apart from the second end along an axial direction, with the first end proximal the leading edge face and the second end proximal the trailing edge face.

2. The rotor blade of claim 1, wherein the suction-side slash face further comprises one or more suction-side undercuts positioned radially inward of the first end and the second end of the damper land of the suction-side slash face, wherein each of the one or more suction-side undercuts have a maximum undercut depth defined in a circumferential direction of the turbomachine.

3. The rotor blade of claim 1, wherein the one or more pressure-side undercuts are positioned radially inward of the first end and the second end of the damper land of the pressure-side slash face, wherein each of the one or more pressure-side undercuts have a maximum undercut depth defined in a circumferential direction of the turbomachine.

4. The rotor blade of claim 3, wherein each of the one or more pressure-side undercuts are arcuate.

5. The rotor blade of claim 3, wherein the maximum undercut depth of each of the one or more pressure-side undercuts is up to about one and a half inches.

6. The rotor blade of claim 1, wherein both the slot of the pressure-side slash face and the slot of the suction-side slash face comprise a leading edge segment, a platform segment, and a trailing edge segment; and wherein the leading edge segment is defined along the leading edge face, the platform segment is defined along the platform, and the trailing edge segment is defined along the trailing edge face.

7. The rotor blade of claim 6, wherein the damper land of the pressure-side slash face is positioned radially inward of the platform portion of the slot defined in the pressure-side slash face; and wherein the damper land of the suction-side slash face is positioned radially inward of the platform portion of the slot defined in the suction-side slash face.

8. A turbomachine, comprising:
   a compressor section;
   a combustor section;
   a turbine section;
   a plurality of rotor blades provided in at least one of the compressor section or the turbine section, each of the plurality of rotor blades comprising:
   a main body having a shank, an airfoil extending radially outwardly from the shank, and a platform, the main body comprising a pressure-side slash and a suction-side slash face, a leading edge face and a trailing edge face;
   wherein each of the pressure-side slash face and suction-side slash face each comprises a damper land and defines a slot; and
   wherein the damper land of the pressure-side slash face is disposed radially inward from at least a portion of the slot of the pressure-side slash face, wherein both the damper land of the pressure-side slash face and the slot of the pressure-side slash face at least partially define one or more pressure-side undercuts, and wherein the damper land of the suction-side slash face is disposed radially inward from at least a portion of the slot of the suction-side slash face; wherein both the damper land of the pressure-side slash face and the damper land of the suction-side slash face comprise a first end and a second end, the first end spaced apart from the second end along an axial direction, with the first end proximal the leading edge face and the second end proximal the trailing edge face.

9. The turbomachine of claim 8, wherein the suction-side slash face further comprises one or more suction-side undercuts positioned radially inward the first end and the second end of the damper land of the suction-side slash face, each of the one or more suction-side undercuts having a maximum undercut depth defined in a circumferential direction of the turbomachine.

10. The turbomachine of claim 8, wherein the pressure-side slash face further comprises one or more pressure-side undercuts positioned radially inward the first end and the second end of the damper land of the pressure-side slash face, each of the one or more pressure-side undercuts having a maximum undercut depth defined in a circumferential direction of the turbomachine.

11. The turbomachine of claim 10, wherein each of the one or more pressure-side undercuts are arcuate.

12. The turbomachine of claim 10, wherein the maximum undercut depth of each one of the one or more pressure-side undercuts is up to about one and a half inches.

13. The turbomachine of claim 8, wherein both the slot of the pressure-side slash face and the slot of the suction-side slash face comprise a leading edge segment, a platform segment, and a trailing edge segment; and wherein the leading edge segment is defined along the leading edge face, the platform segment is defined along the platform, and the trailing edge segment is defined along the trailing edge face.

14. The turbomachine of claim 13, wherein the damper land of the pressure-side slash face is positioned radially inward of the platform portion of the slot defined in the pressure-side slash face; and wherein the damper land of the suction-side slash face is positioned radially inward of the platform portion of the slot defined in the suction-side slash face.

15. A rotor blade for a turbomachine, the rotor blade comprising:
   a main body having a shank, an airfoil extending radially outwardly from the shank, and a platform, the main body comprising a pressure-side slash face and a suction-side slash face, a leading edge face and a trailing edge face;
   a slot defined in each of the pressure-side slash face and suction-side slash face; and
   a damper land disposed radially inward from the platform in each of the pressure-side slash face and the suction-side slash face, wherein each of the damper land of the pressure-side slash face and the damper land of the suction-side slash face includes a first end and a second end, the first end spaced apart from the second end along an axial direction; and wherein one or more undercuts are positioned radially inwardly of the first end and the second end of the damper land in one of the pressure-side slash face or suction-side slash face, and wherein both the damper land of the pressure-side slash face and the slot of the pressure-side slash face at least partially define the one or more pressure-side undercuts; wherein both the damper land of the pressure-side slash face and the damper land of the suction-side slash face comprise a first end and a second end, the first end spaced apart from the second end along an axial direction, with the first end proximal the leading edge face and the second end proximal the trailing edge face.

* * * * *